July 20, 1948.  H. F. BENNETT  2,445,594
TELECENTRIC PROJECTION LENS
Filed Nov. 2, 1945
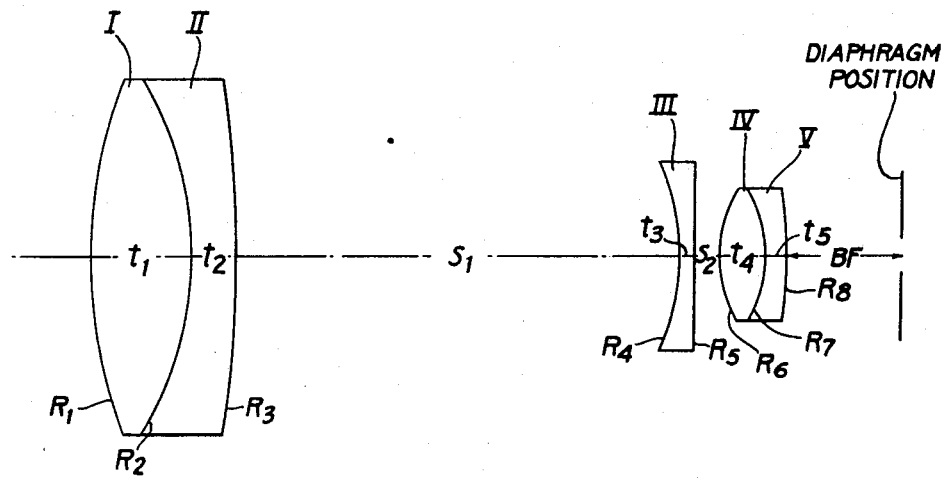
| EF = 100 mm. | | | (FRONT COMPONENT: f = 137 mm.) | |
|---|---|---|---|---|
| LENS | N | V | RADII | THICKNESSES |
| I | 1.572 | 57.4 | $R_1$ = + 91.1 | $t_1$ = 19.7 |
| II | 1.689 | 30.9 | $R_2$ = − 63.7 | $t_2$ = 8.1 |
|  |  |  | $R_3$ = −230. | $S_1$ = 82.0 |
| III | 1.501 | 56.5 | $R_4$ = − 41.7 | $t_3$ = 2.8 |
|  |  |  | $R_5$ = ∞ | $S_2$ = 4.5 |
| IV | 1.548 | 45.9 | $R_6$ = +23.0 | $t_4$ = 8.8 |
| V | 1.689 | 30.9 | $R_7$ = −23.0 | $t_5$ = 2.4 |
|  |  |  | $R_8$ = −137. | BF = 21. |
| FRONT COMPONENT REDUCED TO 100 mm. E.F. | | | | |
|---|---|---|---|---|
| LENS | N | V | RADII | THICKNESSES |
| I | 1.572 | 57.4 | $R_1$ = + 66.5 | $t_1$ = 14.4 |
| II | 1.689 | 30.9 | $R_2$ = − 46.5 | $t_2$ = 5.9 |
|  |  |  | $R_3$ = −167.5 |  |
HAROLD F. BENNETT
INVENTOR
BY Ralph L Chappell
ATT'Y Patented July 20, 1948

2,445,594

UNITED STATES PATENT OFFICE 2,445,594

TELECENTRIC PROJECTION LENS

Harold F. Bennett, Rochester, N. Y., assignor, by mesne assignments, to the United States of America as represented by the Secretary of the Navy Application November 2, 1945, Serial No. 626,370

7 Claims. (Cl. 88—57)

This invention relates to telecentric projection lenses or contour projectors.

The object of the invention is to provide a telecentric objective all of whose components are in front of the diaphragm position and which is reasonably well corrected for distortion and curvature of field.

Telecentric lenses were discovered by I. Porro in 1848 and independently by E. Abbe in 1878. The characteristic feature of these systems is that the position of the diaphragm is such that the principal rays on the short conjugate side of the lens are parallel to the axis. The effect of this arrangement is that the object to be projected may be moved in and out of focus without changing its apparent size on the projection screen. Alternatively the object may have considerable thickness, and part of it may be closer to the lens than the true conjugate plane and part of it farther away. These parts will then be projected at the same magnification. Lenses of this kind are widely used by tool makers for testing gearwheels and similar objects at various stages of their manufacture.

The simple telecentric lens consists of a positive component with a diaphragm at its principal focus on the long conjugate side. The principal rays parallel to the axis on the short conjugate side are then concentrated by the lens so as to pass through the opening in the diaphragm and strike the projection screen beyond. Lenses of this simple type suffer from distortion, which shows up as pincushion distortion on the projection screen. The distortion can be corrected by an auxiliary positive component on the opposite side of the diaphragm to contribute distortion of the opposite sign as shown in my Patent 2,380,210. For some uses, however, this arrangement is not suitable because the conditions of mounting are such that all the components must be on the short conjugate side of the diaphragm position. For example, two such objectives may be arranged with a combining prism so as to project superimposed images of two objects.

For convenience and definiteness in the following description it is pointed out that the short conjugate side of the objective is considered the front because the light is incident on that side, and the long conjugate side is considered the rear.

According to the present invention, the auxiliary lens is placed in front of the diaphragm position and it consists of two separated components, one positive and the other negative. The positive component is closer to the diaphragm position, and the separation is such that the principal point of the combination of the two components is close to the diaphragm position, or even beyond it. In this way the auxiliary lens combination does not contribute worse distortion of the same kind as that of the main lens as would a simple positive lens between the main lens and the diaphragm position. The objective as a whole, accordingly, comprises three components in axial alignment in front of the diaphragm position, of which the first and third are positive and the middle one is negative. Preferably each positive component consists of a bi-convex element cemented onto the front of a meniscus negative element with higher refractive index. The front positive component is spaced from the negative component by a distance greater than $0.4\,f$ and less than $0.8\,f$ where $f$ is the focal length of the front positive component distinguished from $F$ the focal length of the whole lens system. The rear positive component, that is, the one nearest the diaphragm, has a focal length less than $f$ and greater than its distance $BF$ from the diaphragm position and is spaced from the negative component by less than $0.2\,f$. And finally, the focal length of the auxiliary lens group, that is the combined rear two components, is algebraically greater than that of the rear component alone.

It is of further advantage in correcting the distortion, and also helpful in correcting the curvature of field, to make the negative meniscus element of at least one of the positive components and preferably of both positive components, of a glass with refractive index greater than 1.63. According to another preferred feature of the invention, the negative component consists of a single negative element whose refractive index is less than 1.55. Since it is the negative component principally which corrects the distortion, it is advantageous to make the curves of this lens stronger, and this may be done without making the power of the lens greater by making this lens of low refractive index.

While the distortion can be corrected to a satisfactory degree by any of these features, a combination of all of them corrects the distortion without making any of the components extremely strong in curvature and thus makes them more economical to construct. Furthermore, the zonal distortion is less noticeable if all the features are combined.

In the foregoing description of the lens, reference has been made to the diaphragm position. A physical diaphragm with an opening in the middle may be used to limit the rays which form the image, but in some cases the image of the light source acts as the diaphragm, and so it is not strictly accurate to speak of a diaphragm but rather to include both arrangements in the expression "diaphragm position."

The accompanying drawings show a telecentric projection lens according to the most preferred embodiment of the invention.

The data for this example are given in the following table for a focal length of 100 mm.:

| Lens | N | V | Radii | Thicknesses |
|---|---|---|---|---|
| I | 1.572 | 57.4 | $R_1=+91.1$<br>$R_2=-63.7$<br>$R_3=-230$ | $t_1=19.7$<br>$t_2=8.1$<br>$s_1=82.0$ |
| II | 1.689 | 30.9 | | |
| III | 1.501 | 56.5 | $R_4=-41.7$<br>$R_5=\infty$ | $t_3=2.8$<br>$s_2=4.5$ |
| IV | 1.548 | 45.9 | $R_6=+23.0$ | $t_4=8.8$ |
| V | 1.689 | 30.9 | $R_7=-23.0$<br>$R_8=-137$ | $t_5=2.4$<br>BF=21 |

In this table, the refractive index N is given for the D line of the spectrum, the radii R, the thicknesses t and spaces s are numbered from front to rear in the usual manner, and the + and − signs pertain to surfaces which are respectively convex and concave toward the incident light.

This particular objective was designed for a magnification of 2. The focal length $f$ of the front component is 1.37 F, that of the rear positive component is 0.44 F, and that of the auxiliary lens group as a whole is 0.80 F. The projection screen should be about 220 mm. behind the objective, and the object about 5 mm. in front. The diaphragm position is about 20 mm. behind the rear component of the objective. In practice it is desirable to adjust the spacing between the components slightly in order to obtain the best balance between the distortion and the curvature of the field for the particular field which is to be covered.

It is well known that in the case of ordinary distortion the displacement of an actual image point from the theoretical image point is proportional to the cube of the distance from the axis. By theoretical image point is meant the image point computed by the paraxial equations. This particular objective has slight distortion (about 0.5% or 1%), but there is some distortion of a higher order which tends to balance out this ordinary distortion. As a result the displacement is approximately linear with respect to the distance from the axis and the final effect is nearly the same as would be obtained by having simply a slightly greater magnification and no distortion.

The space between the negative component and the front component is 0.6 $f$ in accordance with the invention. The other features of the invention are obvious from the drawings and from the above table of figures.

A suitable source of illumination for the object is a lamp with a concentrated filament collimated by a lens which is identical with the front component of the objective and is symmetrically arranged therewith with respect to the object plane.

The front component of the objective is in itself an achromat so well corrected for spherical aberration, zonal spherical aberration, and coma that it forms a sharp image even with an aperture greater than f/3. It is believed that this in itself is a novel and useful article of manufacture. The focal length of this component alone is 137 mm., and its aperture is f/2.1. When multiplied down to 100 mm. for comparison with other achromats, it has the following specifications:

| Lens | N | V | Radii | Thicknesses |
|---|---|---|---|---|
| I | 1.572 | 57.4 | $R_1=+66.5$<br>$R_2=-46.5$<br>$R_3=-167.5$ | $t_1=14.4$<br>$t_2=5.9$ |
| II | 1.689 | 30.9 | | |

If the achromat is to be made with a somewhat larger or smaller aperture, it is economical to change the thicknesses slightly. The thickness of lens II is comparatively insensitive. That is, comparatively large changes can be made in this thickness without noticeably impairing the fine correction of the acromat if $R_3$ is simultaneously changed so as to restore the focal length. The thickness of lens I can also be changed, although not quite so simply. In this case $R_2$ is changed so that in absolute value $$\frac{1-.009 t_1}{R_2}$$

remains approximately equal to 0.28 F and $R_3$ is changed so as to restore the original focal length F. The manner of making these changes will be obvious to any skilled lens designer.

What I claim is:

1. A telecentric objective having a diaphragm position and comprising three components in axial alignment in front of the diaphragm position, of which the first and third are positive and the middle one is negative, each positive component consisting of a biconvex element cemented onto the front of a meniscus negative element with higher refractive index, the front positive component being air-spaced from the negative component by a distance greater than 0.4 $f$ and less than 0.8 $f$ where $f$ is the focal length of the front positive component and which focal length ($f$) is substantially 1.37 times the focal length (F) of the whole system, the rear positive component having a focal length less than $f$ and greater than its distance from the diaphram position and being spaced from the negative component by a finite distance less than 0.2 $f$, and the focal length of the two rear components combined is algebraically greater than that of the rear component alone.

2. An objective according to claim 1 in which the front surface of the negative component has greater dioptric power than its rear surface.

3. A telecentric objective according to claim 1 in which the negative meniscus element of at least one positive component has a refractive index greater than 1.63.

4. A telecentric objective according to claim 1 in which the negative component consists of a single negative element whose refractive index is less than 1.55.

5. An objective substantially according to the specifications shown in the following table:

| Lens | N | V | Radii | Thicknesses |
|---|---|---|---|---|
| I | 1.57 | 57 | $R_1=+0.9F$<br>$R_2=-0.6F$<br>$R_3=-2.3F$ | $t_1=0.2F$<br>$t_2=0.08F$<br>$s_1=0.8F$ |
| II | 1.69 | 31 | | |
| III | 1.50 | 56 | $R_4=-0.4F$<br>$R_5>5F$ | $t_3=0.03F$<br>$s_2=0.05F$ |
| IV | 1.55 | 46 | $R_6=+0.2F$ | $t_4=0.1F$ |
| V | 1.69 | 31 | $R_7=-0.2F$<br>$R_8=-1.4F$ | $t_5=0.02F$ | where N is the refractive index for the D line of the spectrum, V is the Abbe dispersive index, F is the focal length of the objective, $R_8$ is given in absolute value and the other radii with + or — signs according to whether they pertain to surfaces respectively convex or concave toward the front of the objective.

6. A cemented achromat corrected for spherical aberration and coma, with an aperture greater than F/3, substantially according to the following specifications:

| Lens | N | V | Radii | Thicknesses |
|---|---|---|---|---|
| I | 1.57 | 57 | $R_1=+0.7F$ | $t_1=0.15F$ |
| II | 1.69 | 31 | $R_2=-0.5F$ | $t_2=0.06F$ |
|   |      |    | $R_3=-1.7F$ |              | where N is the refractive index for the D line of the spectrum, V is the dispersive index, F is the focal length of the achromat, and the radii are given with + or — signs according to whether they pertain to surfaces respectively convex or concave toward the front of the achromat.

7. A cemented achromat corrected for spherical aberration and coma, with an aperture greater than F/3, consisting of a biconvex element with refractive index about 1.57 and dispersive index about 57 cemented to the front of a meniscus negative element with refractive index about 1.69 and dispersive index about 31, the radius of curvature of the front surface being about 0.7 F where F is the focal length of the achromat and the radius of curvature of the cemented surface being approximately $$\frac{1-.009 t_1\ F}{0.28}$$

where $t_1$ is the axial thickness of the biconvex element.

HAROLD F. BENNETT.

REFERENCES CITED

The following references are of record in the file of this patent:

UNITED STATES PATENTS

| Number | Name | Date |
|---|---|---|
| 1,479,251 | Repp | Jan. 1, 1924 |
| 1,484,853 | Warmisham | Feb. 26, 1924 |

FOREIGN PATENTS

| Number | Country | Date |
|---|---|---|
| 481,830 | Germany | Aug. 31, 1929 |
| 388,215 | Great Britain | Feb. 23, 1933 |